Patented Aug. 21, 1934

1,971,301

UNITED STATES PATENT OFFICE 1,971,301

PRODUCTION OF HYDROCARBONS OF HIGH BOILING POINT

Hans Haeuber, Ludwigshafen - on - the - Rhine, Germany, assignor to I. G. Farbenindustrie Aktiengesellschaft, Frankfort - on - the - Main, Germany No Drawing. Application June 23, 1930, Serial No. 463,360. In Germany August 12, 1929

6 Claims. (Cl. 196—10)

This invention relates to improvements in the manufacture and production of hydrocarbons of high boiling point, in particular viscous hydrocarbons from liquid hydrocarbons of low boiling point.

It has already been proposed to convert olefinic hydrocarbons or mixtures containing these such as mineral oils, tar oils and the like, into hydrocarbons of higher boiling point which are capable of being worked up into lubricating oils, by heating in the presence of aluminium chloride as such. This process has the objection, however, that a cracking of the initial oil or a too far reaching condensation and consequently the formation of asphaltic products may readily take place.

I have now found that the said objection is obviated and excellent yields of high boiling, in particular viscous oils are obtained from liquid olefines and mixtures thereof by employing the aluminium chloride in the form of the double compound thereof with ethylene which has been previously prepared. The process according to the present invention is accordingly effected in the absence of substantial amounts of uncombined aluminium chloride.

The said double compound may be readily obtained as for example by leading at elevated temperatures, as for example at from 40° to 60° centigrade ethylene, or a mixture of ethylene with inert gases such as nitrogen or hydrogen into a solvent substantially free from unsaturated compounds, usually a liquid hydrocarbon, as for example paraffin oil, ligroin, petroleum ether or the like, in which the aluminium chloride is suspended until the aluminium chloride is practically completely converted into the double compound thereof with ethylene. A solution of the double compound of aluminium chloride with ethylene may thus be obtained.

The process may be carried out, for example, by preparing a solution of the said double compound and allowing this solution to act directly on the compound to be treated. The double compound may also be precipitated from the solution by cooling, the solvent poured off and the initial material to be treated, as for example tar oil, added to the double compound, the latter being brought into solution in the tar oil by warming and simultaneous stirring. By a further raising of the temperature the condensation is effected. If desired, gaseous olefines, or gaseous mixtures from any source which contain olefines, may be simultaneously passed into the mixture undergoing treatment.

The reaction temperature and the duration of the reaction depend on the nature of the initial material and can be ascertained by a simple preliminary experiment. Good results are, as a rule, obtained by effecting the condensation at temperatures varying between about 100° and 180° centigrade. The higher the iodine value or the lower the molecular weight of the initial material, the greater will the duration of the treatment and the amount of the condensation agent employed usually be.

The following examples will further illustrate the nature of this invention, but the invention is not restricted to these examples. The parts are by weight.

Example 1

400 parts of a liquid olefinic mixture, obtainable by cracking paraffin oil (iodine value about 140) are added at room temperature to 40 parts of aluminium chloride in the form of the ethylene-aluminium chloride double compound. The whole is brought into solution by heating to 60° centigrade while stirring and the temperature is then kept at from about 150° to 160° centigrade for from 4 to 6 hours.

After cooling the aluminium chloride is separated from the oil by the addition of water and the oil is subjected to a distillation under reduced pressure.

From the 400 parts of the initial material, 392 parts of a reaction product which is liquid to the last fraction are obtained.

The difference between the composition of the initial material and the reaction product is shown in the following table:

| Boiling point at 1 millimetre mercury gauge | Percentage of initial oil | Percentage of final product based on initial material |
|---|---|---|
| Up to 75° centigrade | 48.9 | 5.1 |
| From 75° to 150° centigrade | 33.8 | 34.8 |
| From 150° to 200° centigrade | 8.0 | 26.4 |
| From 200° to 275° centigrade | 9.3 | 16.1 |
| From 275° to 325° centigrade | | 11.1 |
| Above 325° centigrade | | 4.5 |
| | 100.0 | 98.0 |

Therefore loss=2.0 per cent.

Example 2

600 parts of a brown coal tar oil boiling from 50° to 150° centigrade at 1 millimetre mercury gauge and freed from hard paraffin are added to 100 parts of aluminium chloride in the form of the ethylene-aluminium chloride double compound, and a uniform mixture is prepared therefrom by gentle heating and stirring. Then during the course of 12 hours the temperature is allowed slowly to rise to from 160° to 180° centigrade, a mixture of about 20 per cent of propylene, 55 per cent of isobutylene, 10 per cent of β-butylene and 15 per cent of higher olefines being led in at the same time. In all 400 parts of olefines are absorbed.

The end of the reaction may be detected by the almost complete cessation of the absorption of gas, and the contents of the vessel are then worked up in the usual manner.

No formations of resins or even of brittle asphaltic masses takes place whatever.

The reaction product remains distillable even up to the last residues and the higher fractions thereof constitute an extremely viscous oil having a greenish fluorescence.

The reaction product obtained has the following composition:

| Boiling point range at 1 millimetre mercury gauge | Percentage of reaction product |
|---|---|
| From 65° to 150° centigrade | 12 |
| From 150° to 200° centigrade | 14 |
| From 200° to 250° centigrade | 27 |
| From 250° to 300° centigrade | 30 |
| From 300° to 350° centigrade | 11 |
| Above 350° centigrade And loss | 6 |
| | 100 |

What I claim is:—

1. A process for the production of hydrocarbons of high boiling point, which comprises condensing a liquid olefinic mixture, obtained by cracking paraffin oil in the presence of a double compound of ethylene and aluminium chloride while heating to about from 150° to 160° C., but in the absence of a substantial amount of uncombined aluminium chloride.

2. A process for the production of hydrocarbons of high boiling point, which comprises condensing liquid olefinic hydrocarbons of low boiling point by heat-treatment at a temperature between 100° and 180° C. with a double compound of ethylene and aluminium chloride, but in the absence of a substantial amount of uncombined aluminium chloride.

3. A process for the production of hydrocarbons of high boiling point which comprises condensing liquid olefinic hydrocarbons of low boiling point by heat-treatment at a temperature between 100° and 180° C. with a double compound of ethylene and aluminium chloride, but in the absence of a substantial amount of uncombined aluminium chloride, and simultaneously passing a gaseous olefine into the reaction mixture.

4. A process for the production of hydrocarbons of high boiling point, which comprises condensing liquid olefinic hydrocarbons of low boiling point by heat treatment at a temperature between 100° and 180° C. with a double compound of ethylene and aluminium chloride dissolved in a hydrocarbon solvent, but in the absence of a substantial amount of uncombined aluminium chloride.

5. A process for the production of hydrocarbons of high boiling point, which comprises condensing liquid olefinic hydrocarbons of low boiling point in the absence of a substantial amount of uncombined aluminium chloride by heat treatment at a temperature between 100° and 180° C. with a product obtained by passing ethylene in admixture with inert gases at a temperature of from 40° to 60° C. into a suspension of aluminium chloride in a liquid hydrocarbon until the aluminium chloride is completely converted into the double compound thereof with ethylene.

6. A process for the production of hydrocarbons of high boiling point, which comprises condensing liquid olefinic hydrocarbons of low boiling point by heat treatment at a temperature between 100° and 180° C. with a double compound of ethylene and aluminium chloride dissolved in a hydrocarbon solvent, but in the absence of a substantial amount of uncombined aluminium chloride and simultaneously passing a gaseous olefine into the reaction mixture.

HANS HAEUBER.